United States Patent [19]

Schmider

[11] 4,174,484
[45] Nov. 13, 1979

[54] MOTOR WITH A DISK ROTOR

[75] Inventor: Fritz Schmider, Hornberg, Fed. Rep. of Germany

[73] Assignee: Papst-Motoren KG, St. Georgen, Fed. Rep. of Germany

[21] Appl. No.: 708,092

[22] Filed: Jul. 23, 1976

[30] Foreign Application Priority Data

Jul. 24, 1975 [DE] Fed. Rep. of Germany ....... 2533187

[51] Int. Cl.$^2$ ............................................ H02K 11/00
[52] U.S. Cl. .................................. 310/68 R; 310/90; 310/268
[58] Field of Search ............... 310/156, 154, 268, 112, 310/113, 68, 90; 318/138, 259

[56] References Cited

U.S. PATENT DOCUMENTS

| 2,428,781 | 10/1947 | Bowlus | 310/268 |
| 3,189,770 | 6/1965 | Henry-Baudot | 310/156 |
| 3,324,321 | 6/1967 | Kober | 310/156 |
| 3,482,131 | 12/1969 | Lytle | 310/268 |
| 3,845,339 | 10/1974 | Merkle et al. | 310/68 X |
| 3,953,751 | 4/1976 | Merkle et al. | 310/268 X |
| 4,007,390 | 2/1977 | Muller et al. | 310/268 X |

Primary Examiner—Donovan F. Duggan
Attorney, Agent, or Firm—Flynn & Frishauf

[57] ABSTRACT

A cup-shaped shell with a re-entrant bearing member surrounds the rotor on the bottom side and has a rim which is substantially flush with the top of the rotor. On a balcony or shoulder in the outer portion of the shell, the coils of an iron-less stator winding are affixed by means of an adhesive so that they extend self-supportingly inwards into an air gap between two parts of the rotor that are spaced by a separator piece resisting the magnetic forces tending to attract the two parts of the rotor to each other, which member is mounted on the rotor shaft and surrounds, with an intermediate clearance, the re-entrant bushing of the casing. The casing has a downward tubular extension below its floor which together with a cap forms a chamber for a tachogenerator utilizing a toothed disk and a multi-pole rubber magnet for speed control of the motor in connection with a pair of Hall effect generators located between two of the stator coils of the motor and a transistor circuit for operating the motor as a brushless d.c. motor.

39 Claims, 15 Drawing Figures

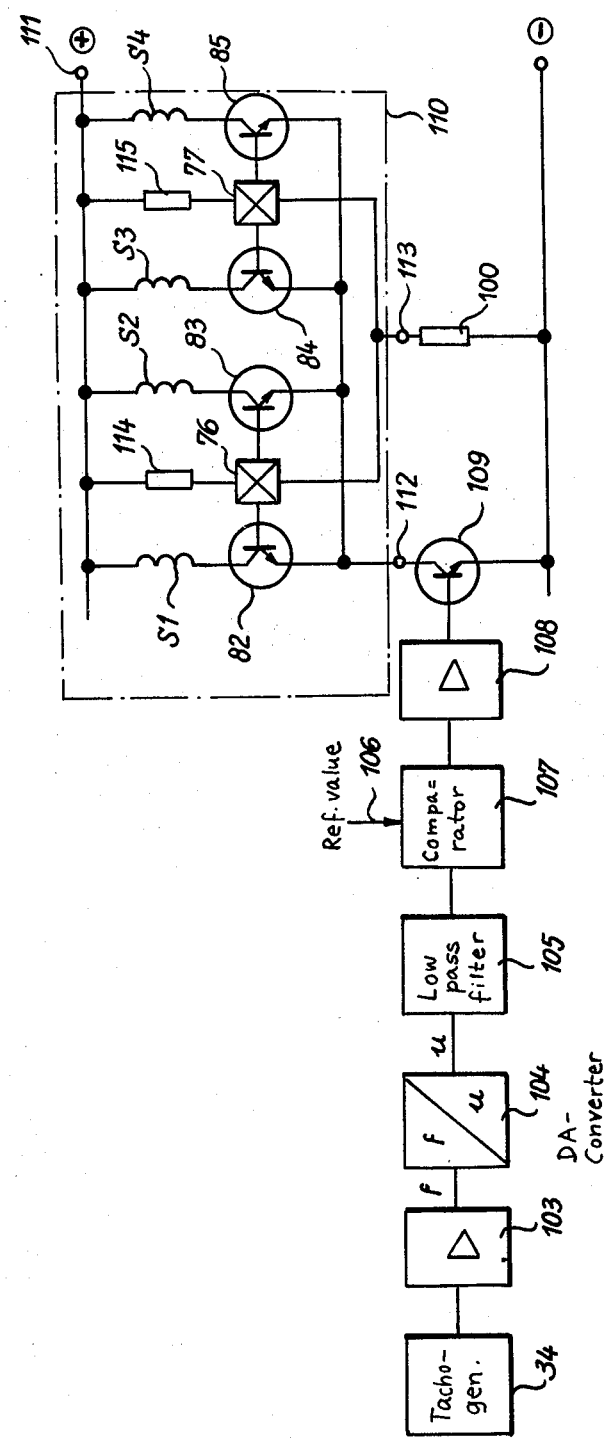

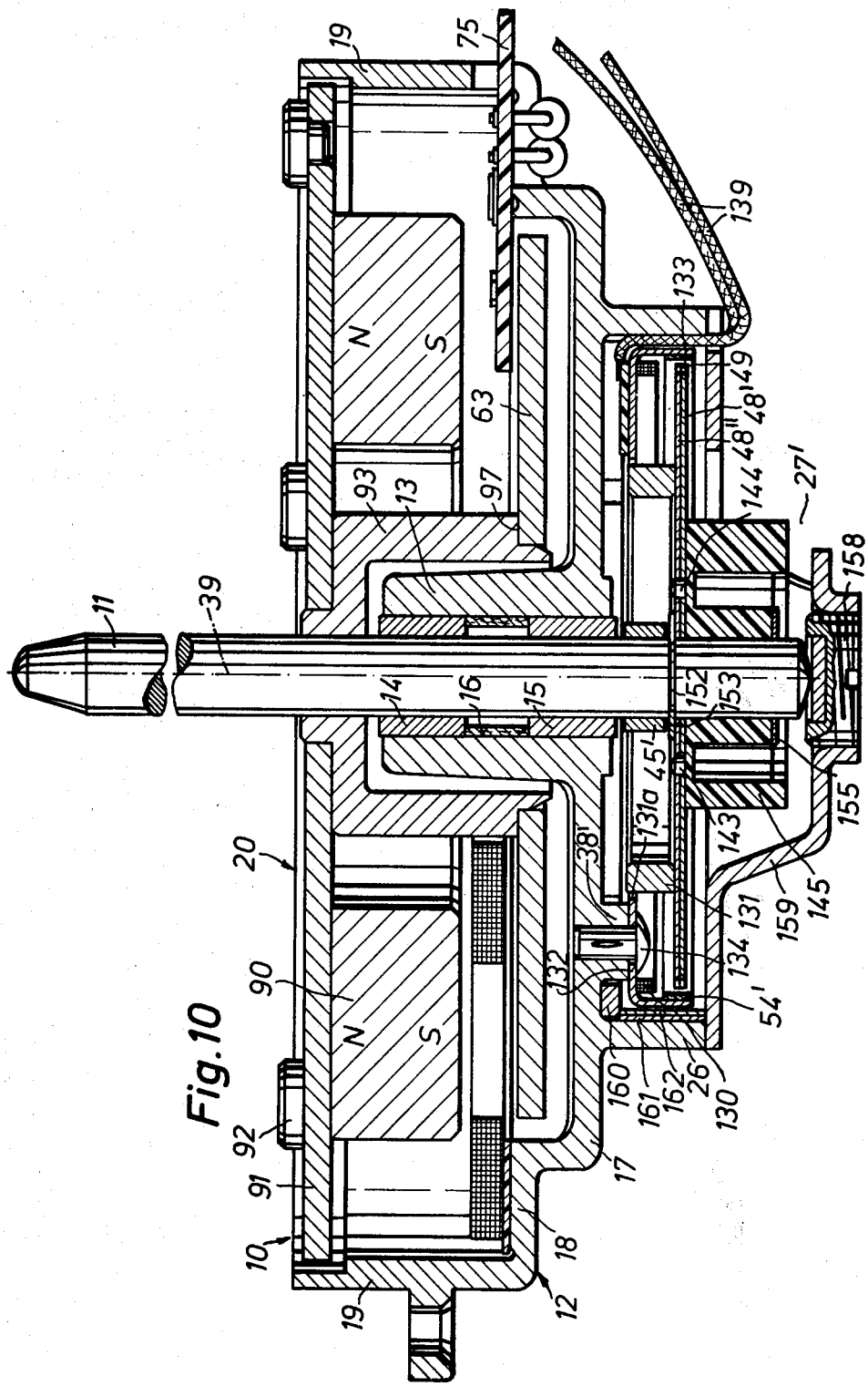

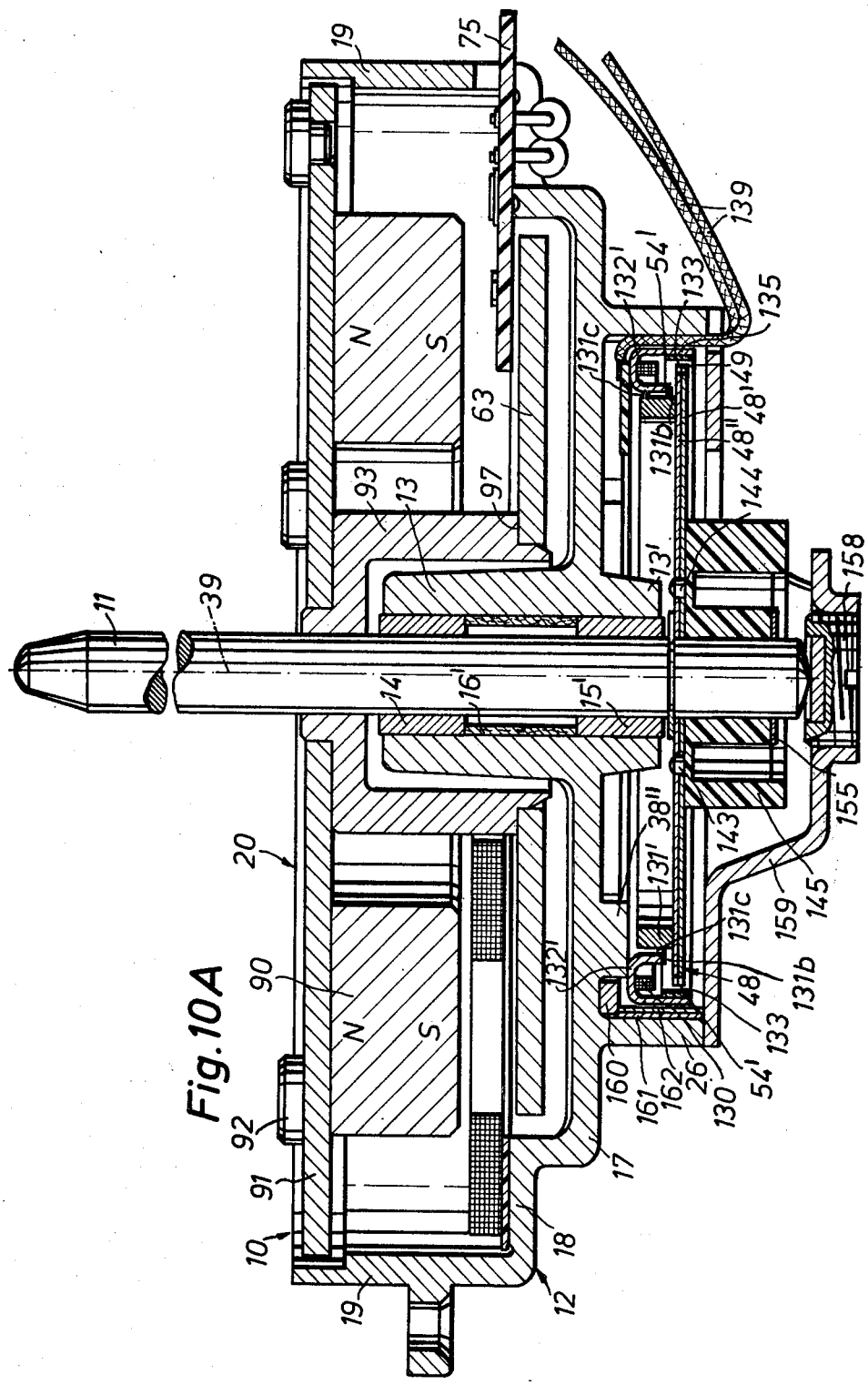

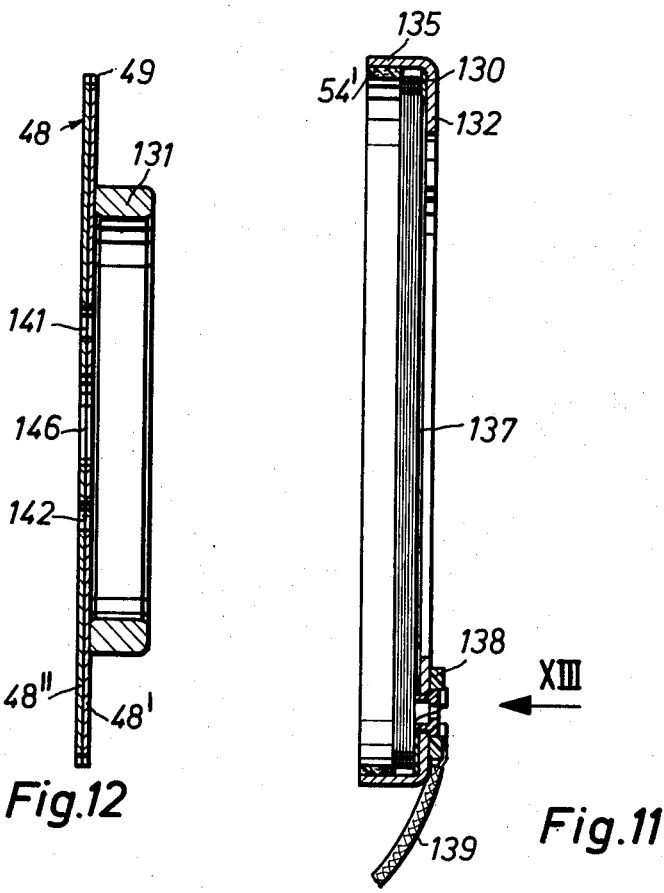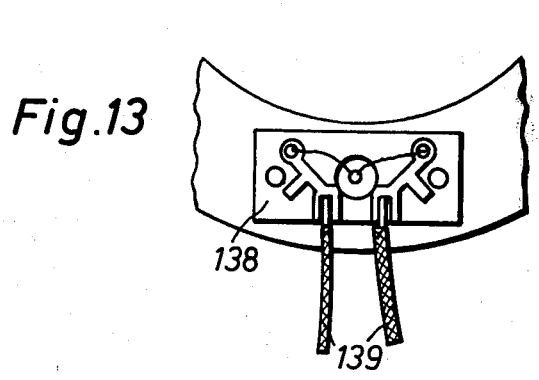

MOTOR WITH A DISK ROTOR

The present invention relates to a motor with a disk rotor, and more particularly to such a motor which may be more simply fabricated.

The present invention preferably relates to such a motor in whose shallow air gap is provided an iron-free stator winding, preferably a slowly rotating brushless direct current motor for directly driving recording and/or playback equipment. Reference is made to U.S. Pat. application Ser. No. 576,650, filed May 12, 1975, for a description of the general type of motor to which the present invention pertains.

Various constructions of disk rotor motors are known, i.e., motors having a flat air gap. These known motors, however, require a relatively large manufacturing expenditure and effort.

The object of the present invention is to simplify such known motors, while maintaining their advantageous characteristics and reducing manufacturing expenditures and effort.

SUMMARY OF THE INVENTION

Briefly, an iron-free stator winding made up of a number of coils is adhesively mounted at its outer edge to the motor casing so that the winding extends self-supportingly into the air gap of the rotor, the rotor being made of two parts held apart by a spacing piece located radially inward of the stator winding and mounted on the rotor shaft so as to receive the magnetic axial forces between the rotor portions. The motor casing is in the form of a shell that envelops the rotor on one side and has a bearing element centrally located which is surrounded by the spacing piece mounted on the shaft above the end of the bearing element, with a clearance between the bearing element and the surrounding spacing peice of the rotor.

In a preferred construction, the bearing element just referred to is tubular and is integral with the motor casing and the spacing piece surrounding it is press fitted on the shaft of the rotor. Furthermore, it is desirable for the casing to have a bottom plate that in its radially outer regions is formed into a balcony-like raised portion on which the outer edges of the stator coils can be affixed. The casing preferably is provided with a rim that is substantially flush with the outer face of the rotor. The motor is preferably constituted as a slow-running brushless d.c. motor and has a substantially tubular extension below the bottom plate of the casing to enclose a speed measuring generator. Preferably, when the rotor has 2p poles and p winding wires, the stator winding has only p individual coils. The electrical angular displacement between neighboring coils may be 270° or 450° and is preferably 270° in each case.

When a tachogenerator is provided, it has construction features cancelling out stray magnetic fields, in particular a measuring coil and a second coil connected in series opposition to each other, the second coil not being linked with the useful flux passing through the measuring coil. Sheet metal magnetic shielding is preferably provided between the motor portion and the tachogenerator. Various other detailed features are also preferably provided which are more fully set forth in the description following below.

BRIEF DESCRIPTION OF THE DRAWINGS

FIG. 9 is a schematic circuit diagram of a control arrangement for a motor according to the present invention;

FIG. 10 is a longitudinal sectional view of a second embodiment of a motor according to the present invention;

FIG. 10a is a longitudinal section view of a modification of the embodiment illustrated in FIG. 10;

FIGS. 11 and 12 are sectional views of individual parts of the embodiment of FIG. 10;

FIG. 13 is a face view of a terminal board also shown in FIG. 11, viewed from the direction of the arrow XIII in FIG. 11.

Identical and identically acting parts are given the same reference numerals throughout the drawings.

DETAILED DESCRIPTION OF ILLUSTRATED EMBODIMENTS

Figure 1:
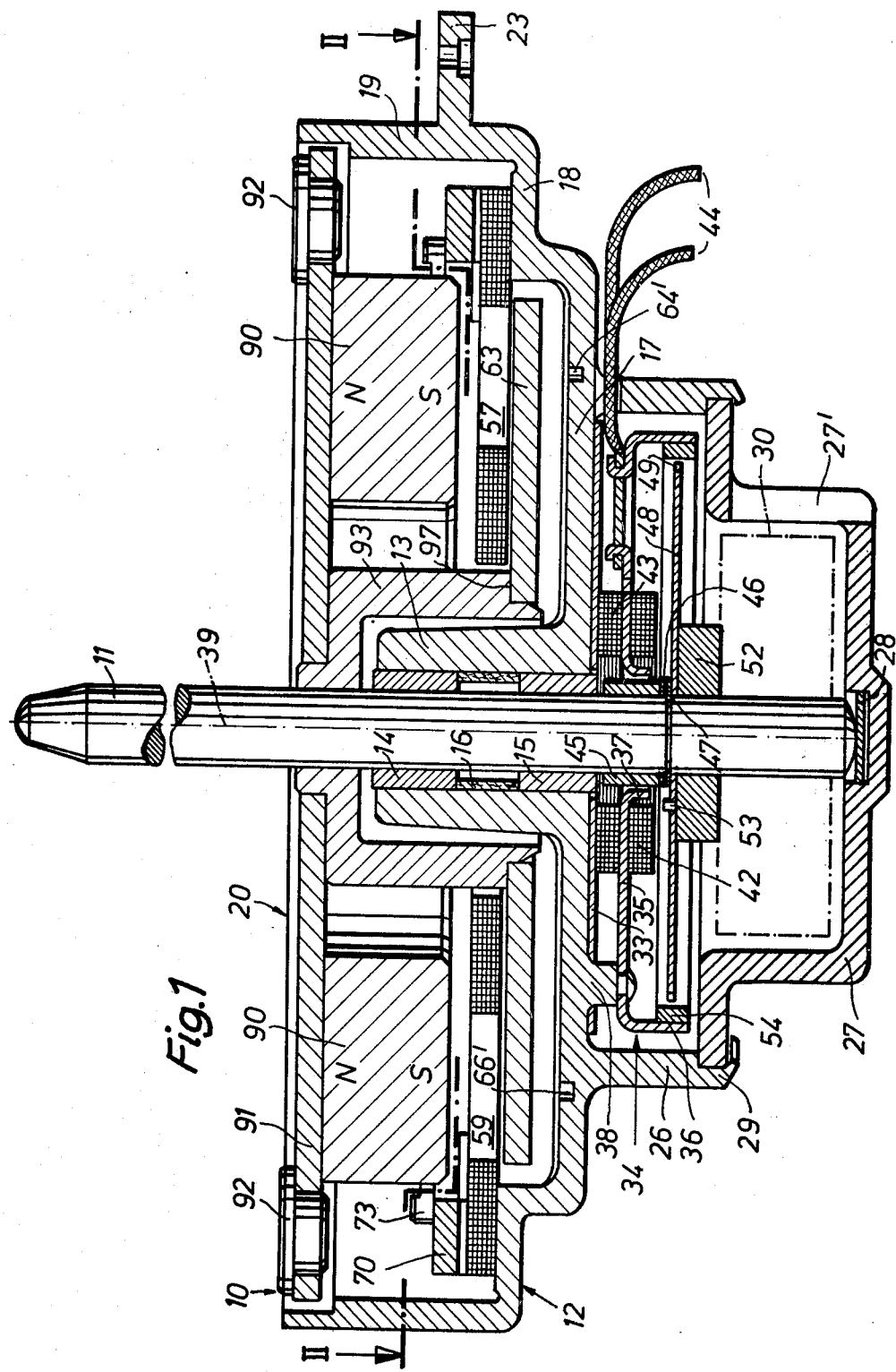
FIG. 1 is a longitudinal sectional view of a first embodiment of a motor according to the present invention.

FIG. 1 shows on a greatly enlarged scale an eight-pole brushless d.c. motor 10, which is constructed as a so-called disk rotor and is preferably used for the direct drive of record players. Motor shaft 11 is used for directly centering records on the not shown turntable which is mounted above the motor 10. Shaft 11 also passes through the motor longitudinal axis 39.

Motor 10 has a pan- or bowl-like die cast casing 12 (e.g. of zinc or aluminum) with an integral bush 13, in the inside of which are provided two sintered bearings 14 and 15. Between the bearings 14 and 15 is a felt washer 16 serving for the storage of oil. As shown, the sintered bearings 14 and 15 serve for the precise radial mounting of the shaft 11 relative to the casing 12.

At the bottom, the bush 13 integrally passes into a base plate 17 of casing 12 and on the outer periphery of the base plate 17 is formed a balcony-like elevation portion 18 which then passes into a casing edge 19 which extends upwards to above rotor 20. Three mounting eyes 23, 24 and 25 (best shown in FIG. 2) are provided externally on casing edge 19 and are preferably integral therewith.

At the bottom, the base plate 17 has an integral tubular extension 26 on whose lower edge is fixed a supporting member 27 for the lower axial bearing 28 of shaft 11. Supporting member 27 is secured to tubular extension 26 for example by bending over the lower edge 29 of member 26 or alternatively by screwing. The supporting member 27 is constructed as a deep drawn cup and serves to receive a part 30, shown only by dotted lines, e.g., a gear wheel or a cam, such as are regularly necessary for driving auxiliary devices on a record player. To the underside of base plate 17 is fixed a disk 33 made from soft magnetic material, e.g. of MU metal. Disk 33 serves to prevent leakage flux from the motor part to a tachogenerator designated generally by the reference numeral 34.

Tachogenerator 34 comprises a substantially trough-shaped part 35 made from soft magnetic material, whose outer edge 36 and inner edge 37 project downwards. Trough-shaped part 35 is fixed to projections 38 of casing base 17 and namely specifically centrally relative to the motor longitudinal axis 39. This central location of part 35 is advantageously achieved by means of a not shown centering tool inserted into the sintered bearing 15. Below part 35 is fixed a measuring coil 42 and above part 35 is fixed a bucking coil 43. Coils 42 and 43 are connected back-to-back, so that a leakage flux emanating from the motor part 35 passes through both coils and in both coils opposite voltages are induced which have the same value and cancel out one another, so that such a leakage flux does not influence the tachometer voltage. The two connections of the series-connected coils 42 and 43 are passed out of the casing 12 at 44.

Within the inner edge 37 of part 35 and radially spaced therefrom, a bush 45 made from soft magnetic material is fixed to shaft 11 and this serves as part of the magnetic return path of tachogenerator 34. Below bush 45 is located a bearing ring 46 and beneath the bearing ring 46 a lock washer 47 is fixed to the shaft 11. On washer 47 is mounted a soft magnetic disk 48, whose periphery carries a plurality of teeth, e.g. 200 teeth 49, which have a precisely identical pitch. The inner bore of disk 48 is precisely central relative to the outer edge of the disk and rests flush on shaft 11, so that the gap between the outer edge of disk 48 and the outer edge 36 of part 35 is virtually the same size at all points. Below disk 48 is provided a retaining and driving member 52, which is fixed to shaft 11 and which has a driver 53 for disk 48. Below member 52 is located gear wheel 30 for driving auxiliaries of the record player.

To the inner periphery of outer edge 36 of part 35 is fixed a radially magnetized magnet ring 54, which has 200 like poles (e.g. 200 south poles—the same number as the number of teeth of disk 48) distributed with the same spacing and juxtaposed over its inner periphery, i.e., it is magnetized in unipolar manner. The magnetic circuit of the magnet ring 54 is therefore closed via outer edge 36, base 35, inner edge 37, bush 45 and the disk 48. If in operation the disk 48 rotates with shaft 11, the magnetic flux flowing in this magnetic circuit fluctuates with a very high frequency. The said magnetic flux is interlinked with the measuring coil 42 and induces therein a relatively high frequency measuring voltage, but not in the bucking coil 43. Thus, a measuring voltage is obtained at conductors 44 which, due to the screening disk 33 and the bucking coil 43, is substantially free from stray voltages induced by the motor part.

Figure 2:
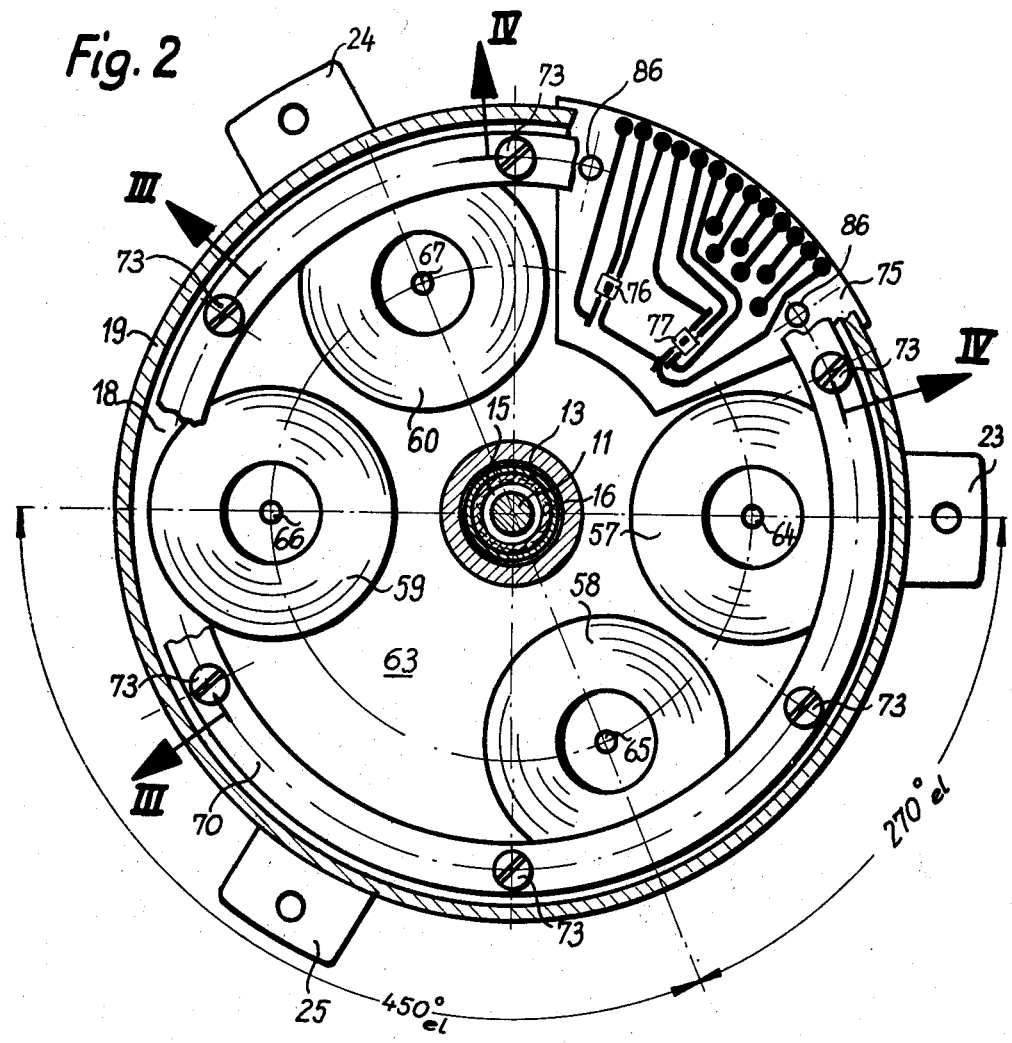
FIG. 2 is a cross-sectional view along the line II—II of FIG. 1.
Figure 3:
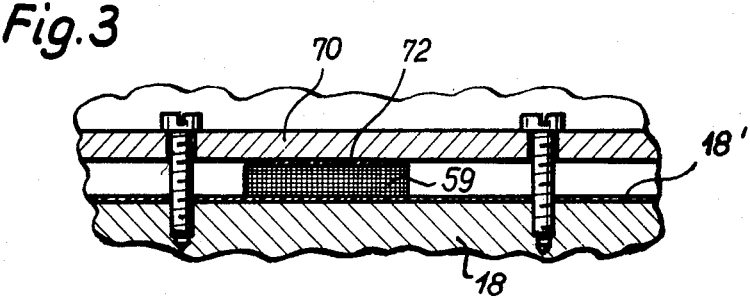
FIG. 3 is a detail, viewed along the line III—III of FIG. 2.

As shown in FIG. 2, four stator coils 57, 58, 59 and 60 constructed as circular coils, are arranged on the balcony-like elevation 18. The coils 57–60 are in each case wound in two-wire form and have the angular distances from one another given in FIG. 2. As shown, their diameter represents approximately 1.4 pole pitches. These coils 57–60 ar so-called baked wire coils i.e., their wires are baked together and consequently form a very stable coil union, which can resist even high bending forces, particularly the not inconsiderable magnetic forces of rotor 20 occurring during assembly and disassembly.

Figure 5:
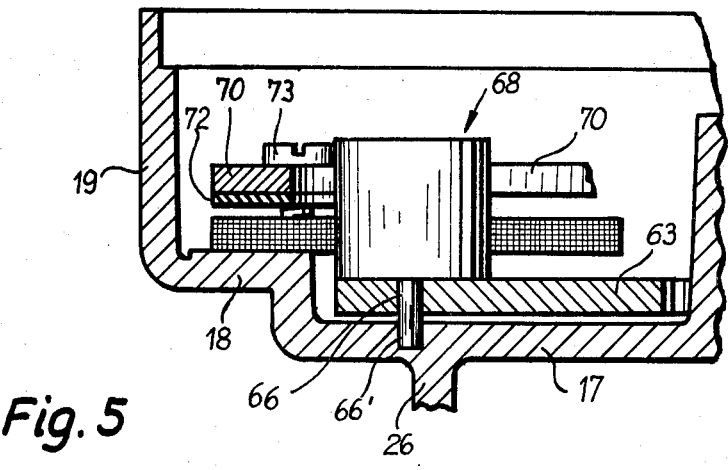
FIG. 5 is a view of the assembly of a coil and the assembly tool used for mounting the coil in the motor.

The rotor 20 has a lower soft iron return path disk 63, which rotates in operation. During coil assembly, this disk 63 is first placed on the casing base 17, as this disk 63 is first placed on the casing base 17, as shown in FIG. 5 and in such a way that the four assembly holes 64, 65, 66, 67 (FIG. 2) provided therein are aligned with corresponding assembly holes in casing base 17. FIG. 1 shows only two assembly holes 64' and 66' of the casing base 17. In accordance with FIG. 5, centering tools 68, whose outer diameter corresponds to the inner diameter of the coils, are inserted in all assembly holes. The four coils 57 to 60 are placed with their inner bores on respective centering tools 68 so that their positions in casing 12 is precisely defined. Then, in accordance with FIG. 2, a non-magnetic assembly ring 70 made from beryllium-copper is mounted on the outsides of the coils. Ring 70 has on its bottom four rubber supports 72, by means of which it presses on the respective outsides of the four coils 57–60. Ring 70 is fixed alongside the coils 57–60 by means of a total of six non-magnetic screws 73 and is pressed downwards against the coils, whereby it is elastically deformed and thus with elastic initial tension maintains the coils 57–60 on an insulating foil 18' on elevation 18.

Prior to the assembly of the coils, or subsequent to the same, if in place of a continuous ring 70 corresponding ring segments are used, a printed wiring board 75 is inserted through an opening in the casing edge 19. On the said board are arranged two Hall generators 76 and 77, resistors 114 and 115 (FIG. 9) associated therewith and four power transistors 82 to 85 for controlling the currents in the four coils 57 to 60.

Figure 4:
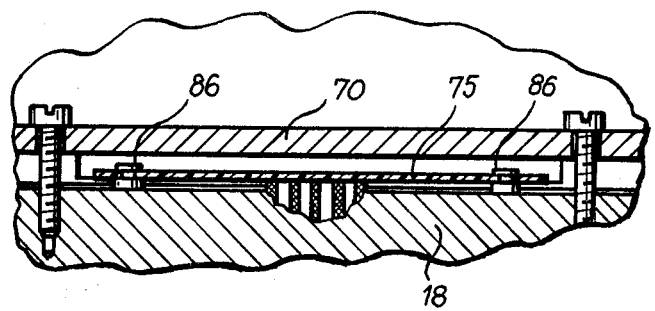
FIG. 4 is a detail, viewed along the line IV—IV of FIG. 2.

As shown in FIGS. 2 and 4, the printed wiring board 75 is riveted to the balcony-like elevation 18 with two rivets 86, so that the Hall generators 76 and 77 are positioned in the sector between the two coils 57 and 60.

The Hall generators are spaced from one another by 90° electric; Hall generator 77 has a spacing of 180° electric from the center of coil 57 and Hall generator 76 a spacing of 180° electric from the center of coil 60. Conductor plate 75 and the four coils are located in the same plane, namely the air gap plane of rotor 20.

After assembly of the coils and printed wiring board 75, the upper part of rotor 20 is mounted. The upper rotor part 20 has an axially magnetized magnet ring 90, which is magnetized with eight poles, whereof only two are shown in FIG. 1. Ring 90 is bonded or adhered to an iron support plate 91, on whose periphery are fixed five aluminum drivers 92, whose tops are somewhat higher than the casing edge 19. In its center, plate 91 is fixed to a bell-shaped spacer 93, which in turn is pressed onto shaft 11. For assembly purposes, shaft 11 is introduced into bush 13, whereat magnet 90 attracts the return path disk 63, so that as shown, the return path disk 63 engages with the lower edge of spacer 93, to which end disk 63 is appropriately guided from the outside through a corresponding opening in the casing. The bell-shaped spacer 93 then spacedly surrounds the bush 13 and can rotate about the bush 13. During assembly of the rotor, the four coils 57 to 60 take up the magnetic tension exerted by magnet 90, and the same effect happens on removing the upper part of the rotor 90, 91, 93, such as may be necessary for repair purposes.

After mounting the rotor 20, the bush 45, bearing disk 46 and lock washer 47 are fitted in place, followed by the disk 48 and member 52 and subsequently optionally gear wheel 30. The thickness of the necessary lower axial bearing disk 38 is then determined and subsequently member 27 together with the bearing disk 28 are fixed to the tubular attachment 26.

Coils 57 to 60 form four phase windings S1 to S4 (cf FIG. 9) and coil 57 is in fact connected in series in two wire form with coil 59 and the same occurs relative to coils 58 and 60. Therefore, coils 57 and 59, due to their two-wire winding, form two phase windings, and the same holds for coils 58 and 60. The associated coils are in each case connected in series in the same sense, i.e., if for example a current flow through one wire of windings 57 and 59, both generate for example, a south pole at the top and a north pole at the bottom thereof. In the symmetrical coil arrangement shown in FIG. 2, such arrangement is necessary, but this has the disadvantage that the leakage flux to tachogenerator 34 is relatively large.

FIG. 9 shows the construction of a control arrangement, such as is particularly well suited for use with a motor according to the invention. The output signal of tachogenerator 34 is amplified in an amplifier 103. The frequency f at the output of amplifier 103 is converted into a real value voltage u in a digital-to-analog converter 104. In a low pass filter 105, this real value u voltage is smoothed and is compared in a comparator 107 with a desired reference value supplied via a lead 106. The output signal of comparator 107 is amplified in an amplifier 108 and supplied to the input of a transistor 109, which controls the motor current in such a way that the motor speed is held very precisely at the desired value, e.g. 33⅓ revolutions per minute.

In FIG. 9, the parts arranged in motor 10 are surrounded by a dash-dotted line 110. It can be seen that the motor, except for the two connections of tachogenerator 34, only requires three additional connecting leads 111, 112 and 113, because resistors 114 and 115 are already arranged on the printed wiring board 75 mounted in the motor. This considerably simplifies assembly work and is therefore very advantageous. Terminal 113 is connected with the negative power lead via a resistor 100.

Figure 7:
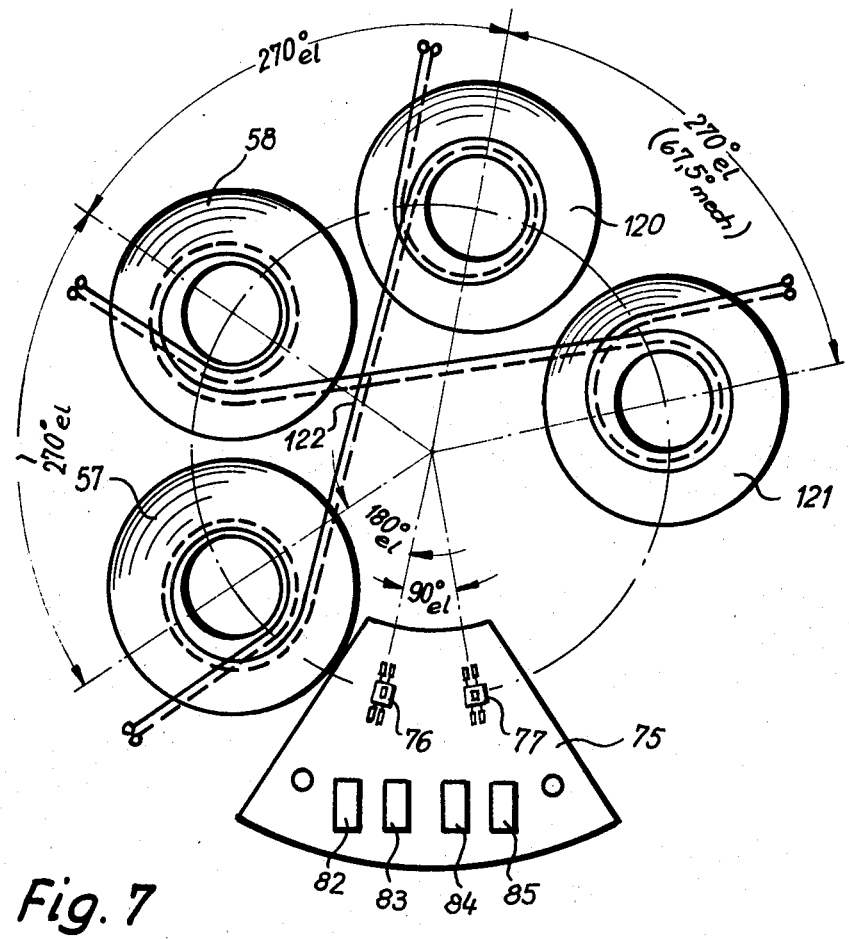
FIG. 7 is a preferred variant of the coil arrangement in an eight-pole brushless d.c. motor.

In order to reduce the leakage flux produced by the stator winding in the case of an eight-pole motor (or analogously with a motor having 16 or 24 poles), a coil arrangement according to FIG. 7 is particularly suitable. The printed wiring board 75 and coils 57 and 58 are arranged in the same manner as in FIGS. 1 and 2. However, the two other coils 120 and 121 are arranged directly following coils 57 and 58 in the direction of rotation. In each case there are 270° electric between coils 57 and 58, 58 and 120, and 120 and 121. In this arrangement of FIG. 7, coils 57 and 120 on the one hand, and 58 and 121 on the other are series connected, as shown, in bifilar and back-to-back manner. For example, if a current flows through the phase winding 122 (coils 57 and 120) the top of coil 57 becomes a south pole and the top of coil 120 becomes a north pole. Thus, in each case unlike poles are produced so that the leakage flux to the tachogenerator 34 is very considerably reduced. Thus, in most cases the shielding plate 33 is completely adequate, making bucking coil 43 superfluous, which means a considerable simplification of the motor and also shortens the axial length of the motor.

Figure 8:
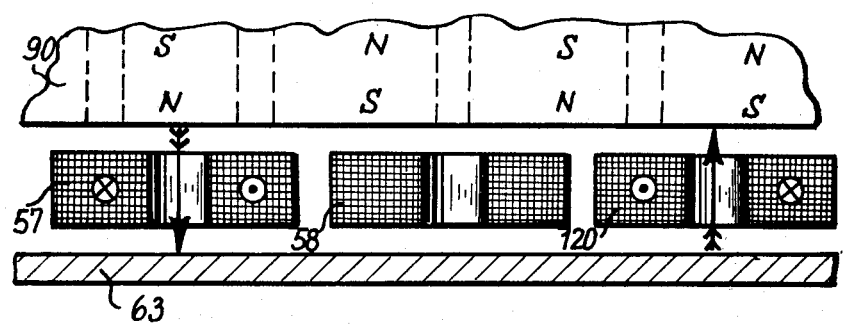
FIG. 8 is a partial schematic representation, in developed form, to illustrate operation of the arrangement of FIG. 7.

FIG. 8 schematically shows the action of the arrangement according to FIG. 7. In this case, coils 57, 58 and 120 are shown in a developed form between magnet ring 90 and the return path disk 63. It can be seen that the flux through coil 57 is in this case opposite to the flux through coil 120, connected in series with coil 57, and naturally the same applies in the case of coils 58 and 121. Therefore, the leakage flux is considerably reduced. In the case of good mounting, the asymmetry of the arrangement relative to the rotor axis does not have a detrimental action.

Figure 6:
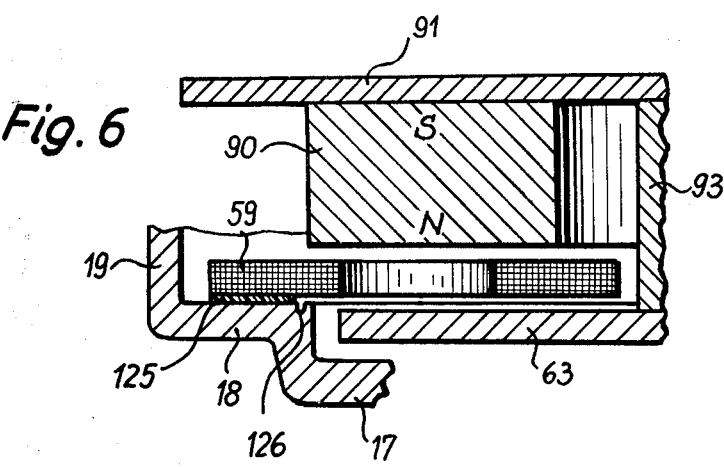
FIG. 6 is an alternative embodiment of the coil attachment by fixing the same to the stator casing for example with an adhesive.

FIG. 6 shows, for example on the coil 59, an alternative manner of attaching the coils. Between the coil 59 and the balcony-like elevation 18 is provided a non-woven fabric part 125, which is impregnated with a two-component adhesive e.g. an epoxy resin. In the manner described above, the coils are adjusted with the pins 68 according to FIG. 5 and then fixedly secured to the casing with a suitable tool and then heated to the hardening temperature of the adhesive. An annular slot or channel 126 prevents the melted adhesive from running down to base portion 17 where it might bond return path disk 63 to base portion 17.

When in the course of hardening the adhesive just mentioned, the adhesive material is warmed in a heating chamber, it becomes soft in the first phase of hardening and penetrates fully into the non-woven fabric part 125, so that the latter, after the hardening of the adhesive, forms a stiff bridge between the coil, e.g. the coil 59, and the balcony-like elevation 18. It has been found in practice that it is possible to fasten the coils most effectively in this fashion. In comparison to fastening of the kind shown in FIGS. 1 to 5, substantially fewer parts are needed. Furthermore, the electrical connections of the individual coils can be stuck fast to the balcony 18 in this adhesion process. These electrical connections are brought out to the plate 75 and there soldered to paths of the conducting pattern.

FIG. 10 shows a different and preferred embodiment of the invention. The parts in FIG. 10 which have the same reference numerals that appear in the Figures described above have the same function as in the previous Figures and are accordingly not again described below. The same is true regarding these reference numerals in FIGS. 10A and 14 mentioned further below.

FIG. 10 shows, inside the tubular extension 26, a tachogenerator of a different construction that is still less sensitive to the penetration of external magnetic fields (whether these originate with the motor or from neighboring electronic apparatus). This is obtained in connection with the high tooth count (e.g. 200 teeth 49) of two superimposed toothed disks 48' and 48" of the same configuration, in such a way that the magnetic return path of a winding 130, which is located concentrically and farther out at the rim of the tachogenerator apparatus, is brought around closely over this winding, so that the flux from the teeth 49 of the toothed disk 48 reaches some distance further through this toothed disk and thence into a ferromagnetic annular disk 131 of heavy cross-section rotating with it, after which it passes through an air gap 131a into the winding 130 which on both sides is closely approached by a surrounding sheet steel part 132 preferably made of soft ferromagnetic material, here shown as provided with a collar 135 and formed as a metal stamping. From the part 132 the flux proceeds to a heteropolar "rubber magnet" 54' magnetized, for example, with 200 north poles and 200 south poles, and from there again over an air gap 133 back to the toothed disk 48. Instead of the trough-shaped part 35 shown in FIG. 1, in this case the annular part 132 is provided with a large central cavity and is fastened to the motor casing 12 by stamped out projections 134. The stator of the tachogenerator, formed by the combination of the winding 130 and the "rubber magnet" 54' is extremely short and is particularly insensitive to external stray magnetic fields. This is a consequence of the fact that the useful flux variations in rotary operation of the toothed wheel 48 are large in comparison with the stray fluxes that might induce a disturbing voltage in the winding 130 through the shaft 11. This is again a consequence of the close envelopment of the winding 130 by the magnetic circuit, as well as the large spacing of this generally torus shaped arrangement from the ferromagnetic shaft 11.

In combination with the coil arrangement of FIG. 7 which is likewise advantageous with regard to external stray magnetic fields, optimum conditions are thus obtained for the case in which an error in the output signal of the tachogenerator might produce a problem as the result of stray field effects. This result is obtained with a motor that is compressed axially as much as possible, having a total height of only a few centimeters, as is practically necessary for a direct drive motor for a turntable.

FIG. 10A shows a modification of the embodiment of FIG. 10, in which the bearing tube 13 is extended downward by an extension 13', so that, in comparison with FIG. 10, the ring 45' can be left out. Between the bearings 14 and 15', there is then a larger axial spacing, i.e. the shaft is better positioned. The disk 153 can turn directly alongside of one of the end faces of the bearing 15'.

FIG. 10A also shows a still further modification of the tachogenerator of FIG. 10. The stator core 132' is trough-shaped (annular trough). It is adhesively secured to the extension 38'. On its inner annular plane bottom surface, the annular winding 130 is attached, by means of a synthetic plastic annular element coated on both sides with an adhesive.

Inside the outwardly projecting edge 135, there are arranged the rubber magnet 54', as well as the toothed rotor disk 48, as in FIG. 10. The inner edge of the trough-shaped stator core projects as for as an axial air gap 131b adjacent the rotating disk 48. In case a relatively large tolerance range is provided for axial adjustment, the air gap 131b is made correspondingly large for the difference.

For this reason, a ferromagnetic return path ring 131' of about the same cross-section as in FIG. 10 (131) is provided, coaxial to the toothed disk 48, so that the flux returned in the magnetic circuit out of the trough-shaped sheet metal piece 132' can go through the radial air gap 131c to this back closure ring 131' and thence to the toothed disk 48 and ultimately the teeth 49 and so on (as in the other figures). With the ring 131' that is axially as thick as practically possible, and radially effective in a parallel plane, the return path resistance of the magnetic circuit of the tachogenerator can be practically independent of the adjustment position of the tachogenerator, because the radial tolerances in the air gap 131c (as also in the air gap 133) can be maintained accurate enough in mass production without particular difficulty. The air gap 131c can for this reason, furthermore, be much smaller than the axial air gap 131b, so that on account of the relatively large cross-section (in the flux direction), the ring 131 provides a much smaller and constant magnetic resistance.

Furthermore, the tachogenerator coil 130 is much more closely enveloped than in FIG. 10 even though the same toothed wheel and rubber magnet are present, which means a still further reduced possibility of stray flux.

FIGS. 11, 12 and 13 show individual parts of the tachogenerator of FIG. 10. FIG. 11 shows the stator with the sheet metal stamping 132 in the collar of which there is affixed, with an adhesive, the magnetic strip or layer 54' (the "rubber magnet") of finely divided magnetic material held together in a synthetic binder, extending axially about half the height of the collar. After this magnetic strip is affixed with adhesive, its inner surface is bored or ground coaxial with the structure on a lathe or drill press, after which a foil 137 coated on both sides with adhesive layers is set on its flat inner surface in the ring 132 in order to provide for fastening the winding ring 130 and to insulate the latter against the metal part of the stator. The wire ends of the ring 130 are passed through a small plate 138 of synthetic material riveted to the part 132 and there soldered to the adjacent ends of two printed circuit conductor paths, from the other end of which a pair of braided wire leads 139 provides a connection to the speed regulator (not shown) of the motor.

FIG. 13 is a partial view of the unit of FIG. 11 in the direction and neighborhood of the arrow XIII of FIG. 11.

The disks 48' and 48" shown in FIG. 12 are stuck together with adhesive coaxially, tooth on tooth, together with the return path ring 131 as shown in FIG. 12 in an apparatus for providing the highest possible concentricity. The return path ring 131 is produced by a sintering process that makes possible highly accurate shape and dimensions for the body so produced, so that no further machining of it is necessary. Projecting studs 143 and 144 of a plastic part 145 extend into the openings 141 and 142 of the disks 48' and 48". The part 145 serves as a drive cam disk for an auxiliary mechanism that can extend through the opening 27' of the motor casing for powering connection with external elements of the apparatus to be driven, for example with a device for moving the pick-up arm of a record player. The central opening 146 of the disk 48 requires very narrow tolerances for concentricity of this disk relative to the shaft 11, whereas the studs 143 and 144 are so provided as to allow play in the openings 141 and 142, so that the studs merely carry the disk securely with them. On account of the axial thickness and the fine division of the teeth 49, which may number 200 for example, for reasons of metal stamping technology two thinner identical parts 48' and 48" are used to form the disk 48. Increased concentricity and hence a canceling out of smaller eccentricity errors can be obtained if the second disk is rotated 180° relative to the first and then thus affixed to the first with adhesive. In this manner the output voltage of the tachogenerator 34 is made more even and regular, which is very important at low speeds.

The division of the toothed disk 48 into poles ("pole pitch") is preferably about 1/50 of its diameter, and the thickness of the ring magnet 54' is likewise about 1/50 of its diameter.

The tachogenerator stator part shown in FIG. 11 is riveted concentrically from the underside of the casing bottom 17 by means of the rivet-like parts 134, onto the projections 38' of the casing bottom.

After introduction of the rotor with its shaft 11 through the bearings 14 and 15, a spacing ring 45' is pushed onto the shaft 11. The face of the spacing ring 45' can slide on a slip bearing 15 and along a clamping disk 153 which is formed as a U-ring and clamped in a groove 152 of the shaft 11. When the faces of the ring 45 are fully adjacent to said neighboring parts, the return path part 63 of the rotor must not yet come into contact with the disk winding. This adjustment is made by means of a screw 158 which is screwed into a threaded bore of a deep drawn bottom plate 159.

The drive cam 145 made of synthetic material is pushed onto the shaft 11 after the emplacement of the rotor 20 so that it is seated with play, the studs 143 and 144 fitting into the openings 141 and 142 of the toothed disks 48' and 48" and abutting flush on the clamping disk 153. In this position a lower clamping ring 155 is then placed into position. Thereafter the bottom plate 159 is screwed fast to the rim 126 and then by means of the central axial bearing, the rotor is adjusted into its axial position in the manner shown by the adjustable metal screw 158 that is coaxial with the shaft 11.

Since the magnetic strip 54' is axially at least twice as broad as the total thickness of the disks 48, the teeth 49 still remain in the field of the magnetic strip even for relatively large axial shift of the rotor by the screw 158, i.e. the tachogenerator 38 is insensitive to an axial shift of the shaft 11.

Two soft iron strips 161 and 162, which are fitted around the shell portion 132, i.e. mutually overlapping, and a flat stamping 160 of soft iron which in contour is somewhat horse-shoe shaped and lies between the shell part 132 and the motor, screen the tachogenerator 34 from stray magnetic fields and, suprisingly, also from such stray fields as may be produced by the electronic equipment located on the other side of the motor, for example from a power transformer or the like. As found in practice, this advantage holds for the power frequency range and up to 1,000 Hz.

Figure 14:
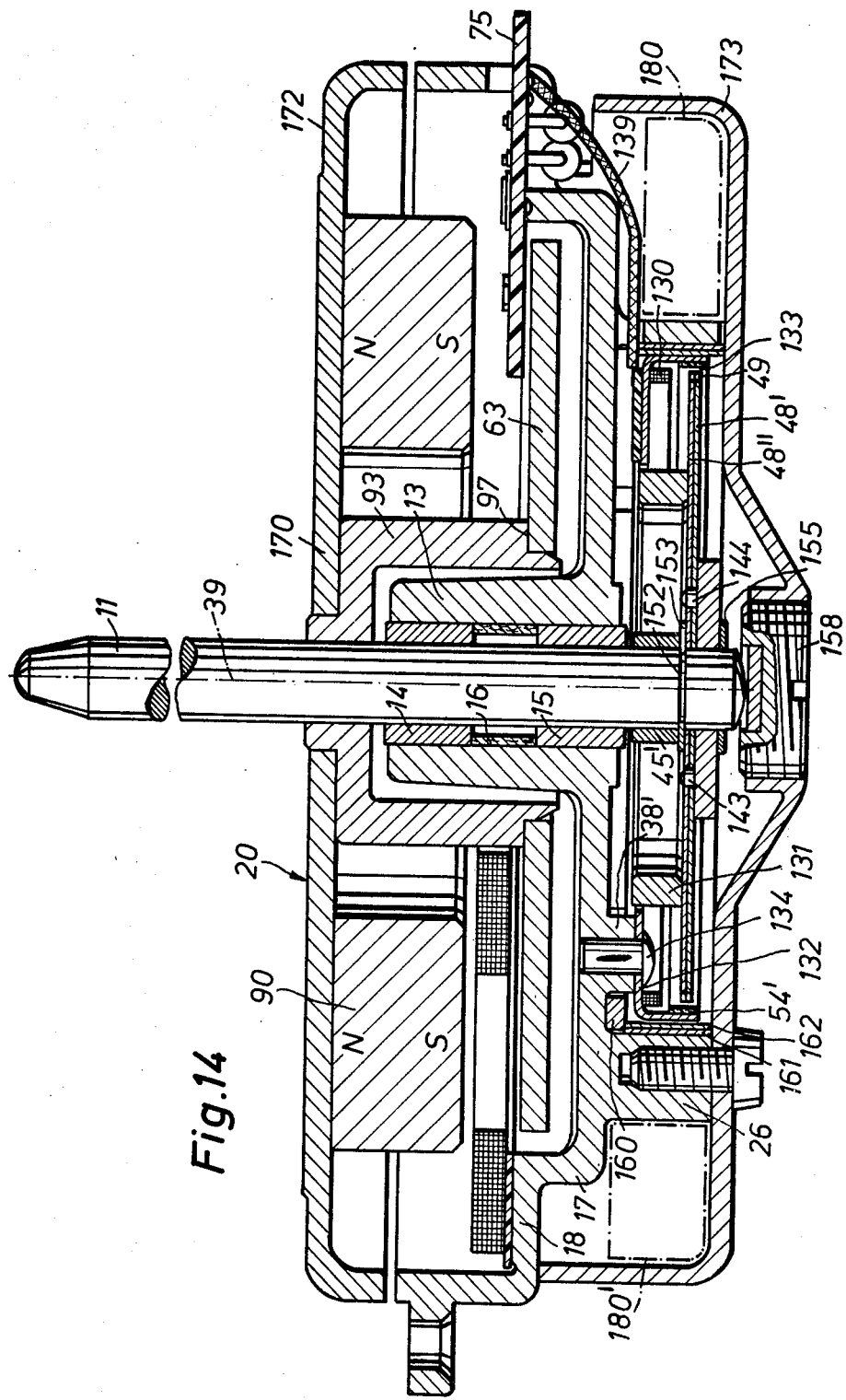
FIG. 14 is a longitudinal sectional view of a third embodiment of a motor according to the present invention, differing from the embodiment of FIG. 10 by a modification of the rotor.

FIG. 14 shows a modification in which the rotor part of the motor is differently constituted. In this case it is not contained in the rim 19 of the casing 12, but, as seen in the axial direction, closes it off flush. The upper cover disk is constituted as a shell-like part 170 that has a donwardly turned ring shoulder 172. On the bottom part 18 of the casing there is seated a cup-shaped hub 173 extending downward, which as illustrated is screwed fast to the rim 26. The cup-shaped member 173 is closed and has a central disk 158 which is axially adjusted from below. The entire electronic equipment of the motor can be located in the region 180 below the cup-shaped member 173.

It will be understood that the motor of the present invention can in a similar way be equipped with another kind of tachogenerator, for example a tachogenerator operating optically. Similarly, other modifications and variations may be made within the scope of the inventive concept.

I claim:

1. Brushless d.c. motor having a substantially disk-shaped permanent magnet rotor mounted on a shaft, a flat air gap and an iron-free stator winding arrangement comprising coils affixed to the motor casing at their radially outer portions so that said coils extend self-supporting into said air gap, said rotor comprising spacing means (93) located radially inward of said stator winding arrangement and between rotor portions extending respectively on both sides of said stator winding arrangement for withstanding magnetically produced axial forces between said rotor portions, said motor casing (12) being substantially shell-shaped and arranged to surround at least part of said rotor, said spacing means (93) surrounding with an interposed clearance a tubular bearing means (13) firmly attached to said motor casing (12) for journalling the shaft (11) of said rotor, said spacing means (93) being mounted so as to rotate with said shaft (11).

2. Brushless motor as defined in claim 1, in which said motor casing has a bottom plate (17) that in its radially outer regions is formed into a balcony-like raised portion (18) on which the stator coils (57 to 60) are affixed at their radially outer sides.

3. Brushless d.c. motor as defined in claim 2, in which said motor casing (12) has a substantially said extension (26) below the bottom plate (17) of the casing in which a speed measuring generator is located.

4. Brushless d.c. motor as defined in claim 3, in which within the tubular extension (26) a tachogenerator (34) is provided which is coaxial with the rotor shaft (39).

5. Brushless d.c. motor as defined in claim 4, in which the tachogenerator (34) has a compensatory construction features (33) with respect to stray magnetic fields penetrating the tachogenerator.

6. Brushless d.c. motor as defined in claim 5, in which said tachogenerator (34) has a measuring coil (42) and also a second coil (43) substantially identical with said measuring coil (42) connected in series opposing relation with said measuring coil and in which said second coil (43) is not linked with the useful flux passing through the measuring coil.

7. Brushless d.c. motor as defined in claim 6, in which magnetic shielding of sheet metal (33) is provided between the motor portion and the tachogenerator (34).

8. Brushless d.c. motor as defined in claim 4, in which said tachogenerator (34) has a radially magnetized stationary ring magnet (54') with a pole pitch in the range of 1 to 3% of the diameter and of a radial thickness of about 2% of the diameter and also has, inside the ring magnet (54'), a coaxially rotating toothed disk arrangement (48), of which the pole pitch corresponds with the pole pitch of the magnet (54'), and in which also the magnetic circuit of the tachogenerator through the toothed disk and the ring magnet is so completed in every radial plane section that it encloses a coaxial measuring coil (13).

9. Brushless d.c. motor as defined in claim 8, in which the measuring coil is located in a shell-like member which surrounds the ring magnet with its outer rim and in which the useful flux of the tachogenerator is led back by this shell-like member radially inward around the measuring coil (130) and into the toothed disk (48) of the tachogenerator rotor.

10. Brushless d.c. motor as defined in claim 9, in which the measuring coil (42) is radially small and the useful flux is led back through the motor shaft around the measuring coil.

11. Brushless d.c. motor as defined in claim 9, in which the return path of the useful flux is brought as closely as possible around a radially large measuring coil (130) lying in a hollow throat of the shell-like member (132).

12. Brushless d.c. motor as defined in claim 11, in which a ferromagnetic ring member (131) is located between the toothed disk (48) of the tachogenerator rotor and the flat bottom of the ring-shaped shell-like member (132), said ferromagnetic ring member (131) having a radial thickness at least about twice as large as the axial thickness of the toothed disk (48) and is arranged to be located with small radial spacing from the teeth (49) of the toothed disk and from the measuring coil (130) with the formation of a minimum air gap resistance (131a).

13. Brushless d.c. motor as defined in claim 11, in which the shell-like member (132) is an annular stamping of sheet steel of trough-shape.

14. Brushless d.c. motor as defined in claim 8, in which the ring magnet (54;54') is constituted as a ring toothed on the inside, with the subdivision into poles equal to the subdivision into teeth.

15. Brushless d.c. motor as defined in claim 3, in which a carrier (27) is affixed to said extension (26) for the lower axial bearing (28) of the rotor.

16. Brushless d.c. motor as defined in claim 15, in which said carrier is constituted in the form of a cup-shaped part and in which said cup-shaped part radially projects from said extension (26) of the casing (12) and is seated on the rim of the motor casing (12).

17. Brushless d.c. motor as defined in claim 15, in which said lower axial bearing (158) is adjustable.

18. Brushless d.c. motor as defined in claim 1, in which said casing (12) has fastening extensions (23) distributed around its circumference in the region where it surrounds the rotor.

19. Brushless d.c. motor as defined in claim 18, in which said casing is provided with a rim (19) substantially flush with the outer face of the rotor (20).

20. Brushless d.c. motor as defined in claim 18, in which the motor is constituted as a slow-running brushless d.c. motor suitable for operating recording and/or playback equipment.

21. Brushless d.c. motor as defined in claim 20, in which for a rotor having 2 p poles and p winding wires, the stator winding has only p individual coils, and in which, further, the motor is coupled to a speed measuring generator.

22. Brushless d.c. motor as defined in claim 21, having only four individual stator coils and in which each of the individual coils electrically encloses between two neighboring individual coils an angle of 270° or 450°.

23. Brushless d.c. motor as defined in claim 18, in which the coils (59) of the stator winding are in each case adhesively bonded by an adhesive (125) to the stator casing (12) by their respective outer sides.

24. Brushless d.c. motor as defined in claim 1, in which at least one non-magnetic strip (70) is provided for fastening of the stator winding (57 to 60), which non-magnetic strip in each case stretches over at least one coil of this winding and presses on both sides of said winding with a clamping force approximately perpendicular to the median plane of said coil.

25. Brushless d.c. motor as defined in claim 1, in which the coils (59) of the stator winding are in each case held fast by an adhesive (125) to the stator casing (12) by their respective outer sides.

26. Brushless d.c. motor as defined in claim 25, in which said motor casing (12) has a balcony-like raised portion (18) having at its inner edge a groove (126) for trapping of adhesive.

27. Brushless d.c. motor as defined in claim 25, in which an absorbent layer (125) saturated with adhesive is provided between the coils (59) and the surface (18) carrying the coils.

28. Brushless d.c. motor as defined in claim 1, in which there is provided in a sector between two stator windings (57,60) a carrier member (75) extending into the air gap of the rotor (20), on which carrier member at least one rotor position sensor (76,77) is mounted.

29. Brushless d.c. motor as defined in claim 28, in which two Hall generators (76,77) and their associated electric conductors are provided on the said carrier member (75).

30. Brushless d.c. motor comprising a permanent magnet rotor having a number of poles integrally divisible by four, stator means comprising a plurality of ironless coils arranged in a one layer winding arrangement, said coils being connected to form a plurality of phase windings (122, S1–S4), rotor position sensing means (76, 77) for controlling the currents in said phase windings so as to obtain four current pulses per rotor rotation angle of 360 electrical degrees and to create in operation a rotary magnetic field driving said permanent magnet rotor, said winding arrangement comprising two sets of coils, each set comprising at least one pair of coils electrically connected with each other and oppositely poled with respect to each other and spaced from each other by (2n + 1) times 180 electrical degrees, where n is a low positive integer.

31. Brushless d.c. motor as defined in claim 30, in which said motor has a flat airgap, said winding is a flat one-layer winding extending into said airgap, and a tachogenerator arranged to be driven by said rotor is provided in the vicinity of said motor and comprises at least one measuring coil disposed for having voltages induced therein during operation of said motor.

32. Brushless d.c. motor as defined in claim 31, in which said tachogenerator (34) has a measuring coil (42) and also a second coil (43) substantially identical with said measuring coil (42) connected in a series opposing relation with said measuring coil and in which said second coil (43) is not linked with the useful flux passing through the measuring coil.

33. Brushless d.c. motor as defined in claim 31, in which magnetic shielding of sheet metal (33) is provided between the motor portion and the tachogenerator (34).

34. Brushless d.c. motor as defined in claim 31, in which the coils (59) of the stator winding are in each case adhesively bonded by an adhesive (125) to the stator casing (12) by their respective outer sides.

35. Brushless d.c. motor as defined in claim 31, in which there is provided in a sector between two stator coils (57, 60) a carrier member (75) extending into the air gap of the rotor (20), on which carrier member at least one rotor position sensor (76, 77) is mounted.

36. Brushless d.c. motor as defined in claim 30, in which the width of said individual coils is substantially greater than 180 electrical degrees.

37. Brushless d.c. motor as defined in claim 30, in which the coils are wound as bifilar coils, the two wires of the coils of a set being connected to form two phase windings per set.

38. Brushless d.c. motor comprising a multipolar permanent magnet rotor, stator means having a plurality of ironless coils arranged in a one layer winding arrangement, said coils being connected to form a plurality of phase windings (122, S1 to S4), rotor position sensing means (76, 77) for controlling the currents in said phase windings so as to obtain four current pulses per rotor rotation angle of 360 electrical degrees and to create in operation a rotary magnetic field driving said permanent magnet rotor, said winding arrangement comprising at least one set of four coils, of which the first coil has a center distance of 270 electrical degrees from the second coil, the second coil has a center distance of 270 electrical degrees from the third coil, and the third coil has a center distance of 270 electrical degrees from the fourth coil, the first coil being electrically connected with the third coil and oppositely poled with respect to it, and the second coil being electrically connected with the fourth coil and being oppositely poled with respect to it.

39. Brushless d.c. motor as defined in claim 38, in which said motor has a flat airgap, said winding is a flat one-layer winding extending into said airgap, and a tachogenerator arranged to be driven by said rotor is provided in the vicinity of said motor and comprises at least one measuring coil disposed for having voltages induced therein during operation of said motor.

* * * * *

Disclaimer 4,174,484.—*Fritz Schmider*, Hornberg, Germany. MOTOR WITH A DISK ROTOR. Patent dated Nov. 13, 1979. Disclaimer filed May 5, 1980, by the assignee, *Papst Motoren KG*.

Hereby enters this disclaimer to claims 30 through 39 of said patent.

[*Official Gazette July 8, 1980.*]